(12) United States Patent
Kitada et al.

(10) Patent No.: US 7,720,758 B2
(45) Date of Patent: *May 18, 2010

(54) SYSTEM, COMPUTER PROGRAM PRODUCT AND METHOD FOR MANAGING BILLS ISSUED FROM APPLICATION SERVICE PROVIDERS

(75) Inventors: Hiroshi Kitada, Tuckahoe, NY (US); Shogo Hyakutake, Boonton Township, NJ (US); Hiroaki Ishizuka, San Jose, CA (US); Minoru Aoshima, Edgewater, NJ (US); Akio Kizawa, Ridgewood, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 1464 days.

This patent is subject to a terminal disclaimer.

(21) Appl. No.: 09/949,969

(22) Filed: Sep. 12, 2001

(65) Prior Publication Data
US 2005/0246272 A1 Nov. 3, 2005

(51) Int. Cl.
*G06Q 40/00* (2006.01)
(52) U.S. Cl. .................................. 705/40
(58) Field of Classification Search .............. 705/40
See application file for complete search history.

(56) References Cited

U.S. PATENT DOCUMENTS

| | | | | |
|---|---|---|---|---|
| 6,009,442 | A * | 12/1999 | Chen et al. | 715/522 |
| 6,078,906 | A * | 6/2000 | Huberman | 705/37 |
| 6,262,732 | B1 | 7/2001 | Coleman et al. | |
| 6,266,401 | B1 * | 7/2001 | Marchbanks et al. | 379/116 |
| 6,480,304 | B1 | 11/2002 | Os et al. | |
| 6,496,206 | B1 | 12/2002 | Mernyk et al. | |
| 6,510,558 | B1 * | 1/2003 | Iinuma et al. | 725/113 |
| 6,584,466 | B1 * | 6/2003 | Serbinis et al. | 707/10 |
| 6,721,956 | B2 * | 4/2004 | Wasilewski | 725/60 |
| 6,788,709 | B1 * | 9/2004 | Hyakutake | 370/486 |
| 6,804,705 | B2 * | 10/2004 | Greco et al. | 709/219 |
| 7,092,696 | B1 * | 8/2006 | Hosain et al. | 455/405 |

(Continued)

FOREIGN PATENT DOCUMENTS

JP 2002123620 * 3/2002

OTHER PUBLICATIONS

U.S. Appl. No. 10/294,607, filed Nov. 15, 2002, pending.

(Continued)

*Primary Examiner*—Jagdish N Patel
*Assistant Examiner*—Sara Chandler
(74) *Attorney, Agent, or Firm*—Oblon, Spivak, McClelland, Maier & Neustadt, L.L.P.

(57) ABSTRACT

A method, system and computer program product for managing bills issued from applications service providers (ASPs). The method on which the system and computer readable medium are based includes receiving an ASP service request from a remote user, forwarding the ASP service request to an ASP, receiving a service bill from the ASP, and incorporating the service bill into a unified bill and issuing the unified bill to the remote user. Calculating the ASP fee may include determining a discount offered by the ASP. The discount offered by the ASP may be determined on a customer by customer basis or based on a volume usage of a document management system providing access to the ASP for a plurality of users. The accuracy of the service bill from the ASP may be verified, and a discrepancy between a calculated fee and the billing amount may be determined, and negotiations undertaken with the ASP to resolve the discrepancy. Whether the user pays the bill issued may also be monitored.

33 Claims, 13 Drawing Sheets

U.S. PATENT DOCUMENTS

| | | | |
|---|---|---|---|
| 7,117,247 B2 * | 10/2006 | Hyakutake et al. | 709/206 |
| 7,139,728 B2 * | 11/2006 | Rigole | 705/26 |
| 7,142,690 B2 * | 11/2006 | Hyakutake et al. | 382/100 |
| 7,149,784 B2 * | 12/2006 | Kitada et al. | 709/207 |
| 7,236,950 B2 * | 6/2007 | Savage et al. | 705/34 |
| 7,246,158 B2 * | 7/2007 | Kitada et al. | 709/219 |
| 7,302,411 B2 * | 11/2007 | Ganesan et al. | 705/35 |
| 7,401,125 B1 * | 7/2008 | Uchida et al. | 709/217 |
| 2001/0012346 A1 * | 8/2001 | Terry | 379/112.01 |
| 2001/0025273 A1 * | 9/2001 | Walker et al. | 705/77 |
| 2001/0032185 A1 * | 10/2001 | Masaki | 705/52 |
| 2001/0034677 A1 * | 10/2001 | Farhat et al. | 705/30 |
| 2001/0034693 A1 * | 10/2001 | Farhat et al. | 705/37 |
| 2001/0034704 A1 * | 10/2001 | Farhat et al. | 705/39 |
| 2002/0010915 A1 * | 1/2002 | Maeda | 717/11 |
| 2002/0052840 A1 * | 5/2002 | Kitchen et al. | 705/40 |
| 2002/0069163 A1 * | 6/2002 | Gilbert | 705/40 |
| 2002/0082881 A1 * | 6/2002 | Price et al. | 705/7 |
| 2002/0087487 A1 * | 7/2002 | Hassinger | 705/400 |
| 2002/0099653 A1 * | 7/2002 | De Souza et al. | 705/40 |
| 2002/0114013 A1 * | 8/2002 | Hyakutake et al. | 358/3.28 |
| 2002/0120680 A1 * | 8/2002 | Greco et al. | 709/203 |
| 2002/0143863 A1 * | 10/2002 | Honma et al. | 709/203 |
| 2002/0156801 A1 * | 10/2002 | Kitada et al. | 707/500 |
| 2002/0156834 A1 * | 10/2002 | Kitada et al. | 709/203 |
| 2002/0156853 A1 * | 10/2002 | Hyakutake et al. | 709/206 |
| 2003/0018976 A1 * | 1/2003 | Wasilewski | 725/110 |
| 2003/0037012 A1 * | 2/2003 | Mersky et al. | 705/75 |
| 2003/0043981 A1 * | 3/2003 | Lurie et al. | 379/114.25 |
| 2004/0215671 A1 * | 10/2004 | Hyakutake et al. | 707/203 |
| 2007/0088640 A1 * | 4/2007 | Hyakutake et al. | 705/34 |
| 2007/0094103 A1 * | 4/2007 | Hyakutake et al. | 705/28 |
| 2007/0094358 A1 * | 4/2007 | Uchida et al. | 709/219 |

OTHER PUBLICATIONS

U.S. Appl. No. 10/243,643, filed Sep. 16, 2002, pending.
U.S. Appl. No. 10/243,645, filed Sep. 16, 2002, pending.
U.S. Appl. No. 09/684,965, filed Oct. 10, 2000, pending.
U.S. Appl. No. 09/795,438, filed Mar. 1, 2001, pending.
U.S. Appl. No. 09/839,221, filed Apr. 23, 2001, pending.
U.S. Appl. No. 09/840,155, filed Apr. 24, 2001, pending.
U.S. Appl. No. 10/116,162, filed Apr. 5, 2002, pending.
U.S. Appl. No. 09/785,433, filed Feb. 20, 2001, pending.
U.S. Appl. No. 09/839,263, filed Apr. 23, 2001, pending.
U.S. Appl. No. 11/612,929, filed Dec. 19, 2006, Hyakutake, et al.
U.S. Appl. No. 11/612,943, filed Dec. 19, 2006, Hyakutake, et al.

* cited by examiner

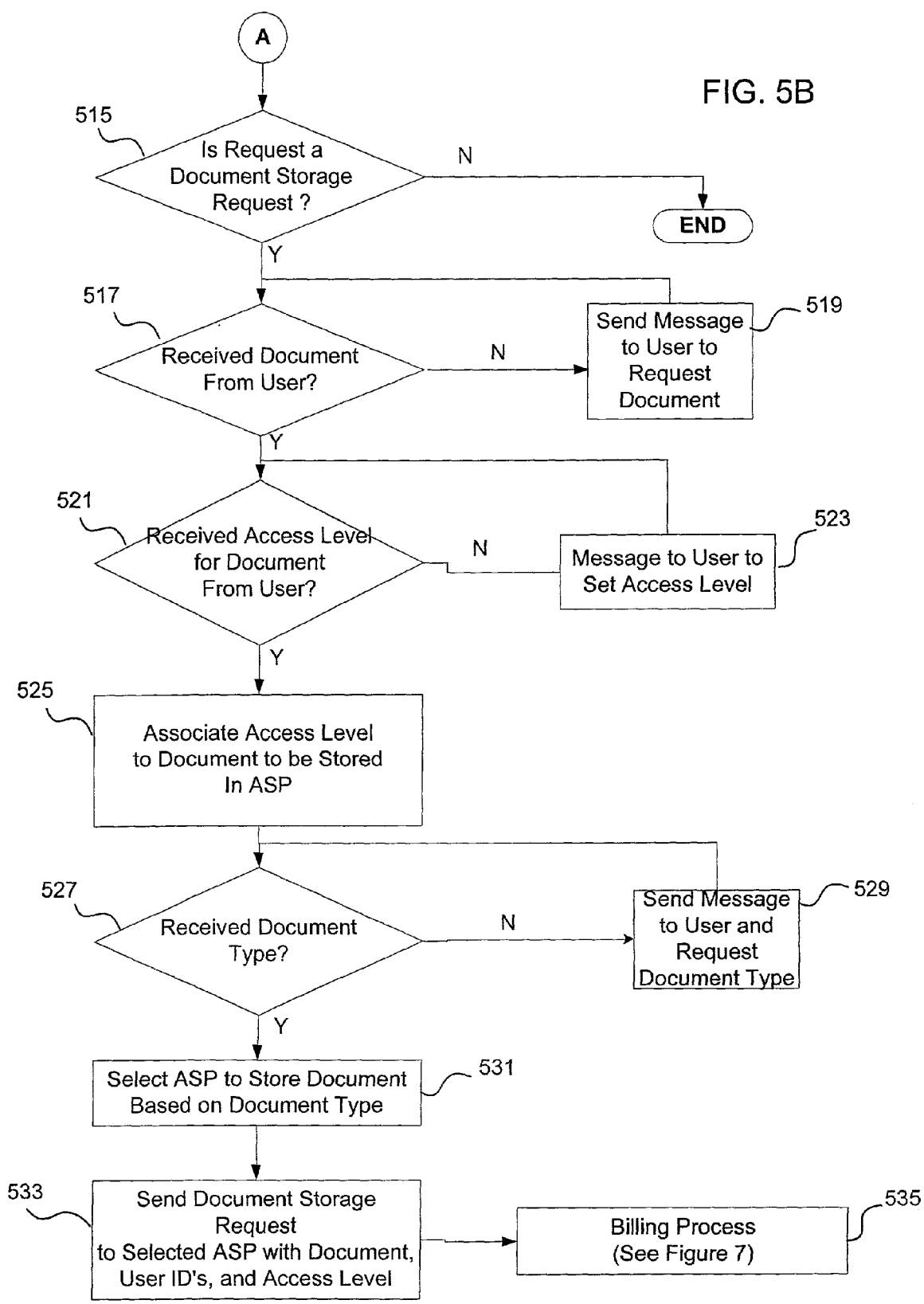

FIG. 8A

Payment from Doc. Mal. to AP (Storing & Retrieving Documents): Fixed Rate

| | Discount Ratio | ~100M Byte | 101~200M Byte | 201~Byte |
|---|---|---|---|---|
| Regular Charge | — | $5 | $10 | $15 |
| Total less than 1G Byte | 40% | $3 | $6 | $9 |
| Total 1G~les than 100G | 60% | $2.50 | | $7.50 |
| Total 100G~ | | $2 | $4 | $6 |

Payment from Doc. Mal. to ASP (Online Printing): Transaction Rate

| | Rate/one page |
|---|---|
| Regular Charge | ¢ 50/one page |
| Special Rate | |

Payment from Doc. Mal. to ASP (Delivering Service): Transaction Rate

| Numbers of Shipping | Discount Ratio | Rate/one shipping |
|---|---|---|
| Regular Charge | — | $10 |
| less than 101 | 50% | $5 |
| 101~200 | 60% | |
| 201~ | 70% | $3 |

815   817   819

FIG. 8D e.g. Monthly Service Fee for Customer

| Svc. | Limits | ASP Charge | Customer Charge | Revenue |
|---|---|---|---|---|
| Storing | 150M Byte/Monthly<br>50G Byte/Total | $5 | $5.50<br>($5X1.1) | $0.50 |
| Printing | 1,000 Pages/Monthly | $250<br>($0.25X1000) | $275<br>($250X1.1) | $25 |
| Delivery | 5 times/Monthly<br>150 times/Total | $20<br>($4X5) | $22<br>($20X1.1) | $2 |
| Total | | $275 | $302.50 | $27.50 |

821   831   823   825   827   829

SYSTEM, COMPUTER PROGRAM PRODUCT AND METHOD FOR MANAGING BILLS ISSUED FROM APPLICATION SERVICE PROVIDERS

BACKGROUND OF THE INVENTION

1. Field of the Invention

The present invention is directed to methods, computer-based systems and computer program products for managing service bills, and in particular managing bills issued from application service providers.

2. Discussion of the Background

An application service provider (ASP) is an entity, typically a company, that offers users remote access to software applications and related services that would otherwise have to be located on the user's local computer. For example, ASPs can provide searchable databases of legal, medical, financial, educational, scientific, or marketing documents to individuals and/or companies via the Internet. Alternatively, some companies may provide in-house type ASPs whereby shared software applications and services are located on a company computer accessible by the employees via a company network. Thus, as used herein, the term "ASP" has a broad meaning that includes a provider that allows a user to use an application not loaded on the user's local computer.

Today, there are a great number of ASPs providing various kinds of documents and services to a user. For example, one ASP may provide legal documents while another provides marketing, educational, scientific, financial, or medical documents. Moreover, one ASP may provide document storage and retrieval services only, while another ASP provides a service to print and deliver documents by way of the postal service or express mail. An example of a conventional network of ASPs connected to a user is shown in FIG. 1. As seen in FIG. 1, document ASPs 10, 20, 30, and 40 are connected to user 72 via the Internet 50. User 72 includes a personal computer (PC) 80, a printer 90, a local storage device 100 and a medium drive 110, and may be part of a home computer system, for example. In this example, user 72 independently connects to one of the ASPs 10-40 which provides the documents and services needed by the user 72. For example, the user 72 may connect to ASP 30 via the Internet 50 and download documents for viewing on the screen of the PC 80, printing with printer 90, or storing in the local storage device 100 and/or medium drive 110.

Where a user needs different kinds of documents or services, the user 72 may have to find and access many different ASPs. For example, where the user 72 wishes to retrieve a document and print and deliver the same document, the user 72 may have to retrieve the document from one ASP that provides only storage and retrieval services, and access a second ASP which provides a print and delivery service. In this regard, the user will receive many service bills that the user must account for and pay separately. This is a burden on the user, particularly if the user is a company having several employees that uses ASPs on a regular basis.

SUMMARY OF THE INVENTION

An object of the present invention is to provide a system, method and computer program product for overcoming the above-described problems.

Another object of the present invention is to provide a system, method, and computer program product for issuing a unified bill to users.

Yet another object of the present invention is to provide a system, method, and computer program product for verifying the accuracy of service bills issued from ASPs.

These and other objects of the present invention are achieved by providing a novel method, system and computer program product for managing bills issued from applications service providers (ASPs). The method on which the system and computer readable medium are based includes receiving an ASP service request from a remote user, forwarding the ASP service request to an ASP, receiving a service bill from the ASP, and incorporating the service bill into a unified bill and issuing the unified bill to the remote user.

In one aspect of the invention, the step of calculating the ASP fee includes determining a discount offered by the ASP. The discount offered by the ASP may be determined on a customer by customer basis or based on a volume usage of a document management system providing access to the ASP for a plurality of users. Where the discount is determined on a customer by customer basis, a transaction report including information about a transaction volume for a particular user is received, the transaction volume is added to a stored user ID volume pertaining to a cumulative volume for the particular user, and a discount for the particular user is determined based on the cumulative volume.

In another aspect of the invention, the accuracy of the service bill from the ASP is verified. In this aspect, receiving a service bill includes receiving a charge amount calculated by the ASP, and receiving a transaction report including information necessary for independently calculating a charge for services requested in the service request. The accuracy of the bill is then verified by receiving a transaction report from the ASP, calculating an ASP fee based on the transaction report, and comparing the calculated amount with an amount of the ASP bill amount. A discrepancy between the calculated fee and the billing amount may be determined, and negotiations undertaken with the ASP to resolve the discrepancy. The present invention may also monitor whether the user pays the bill issued.

BRIEF DESCRIPTION OF THE DRAWINGS

FIGS. 5A-5C are flowcharts illustrating a method of managing documents according to one embodiment of the present invention;

FIGS. 8A, 8B, 8C, and 8D depict data structures for implementing a system for verifying ASP charges and determining ASP discounts, as well as issuing a unified bill in accordance with the embodiment of the present invention;

DESCRIPTION OF THE PREFERRED EMBODIMENTS

Figure 1:
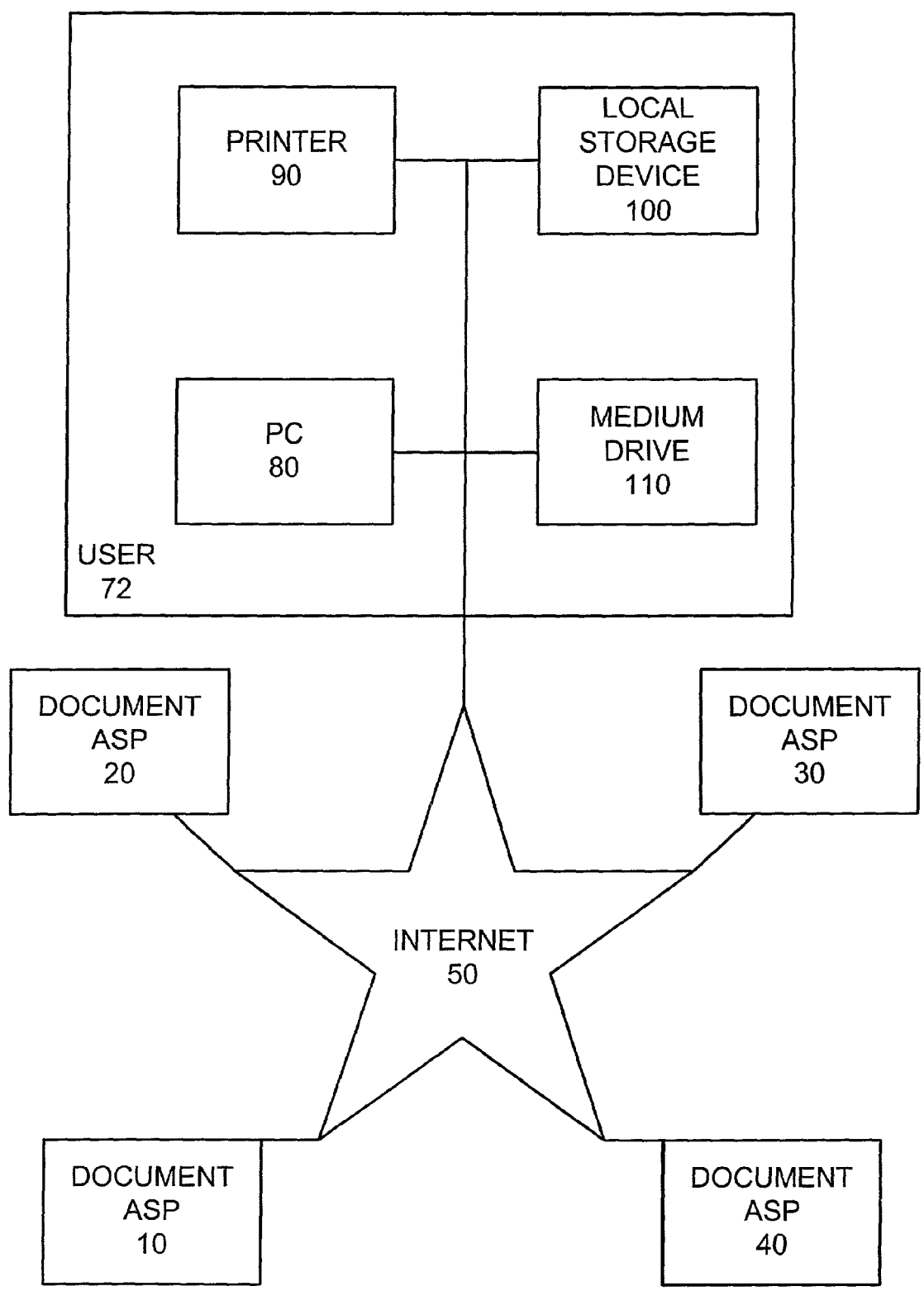
FIG. 1 is a block diagram showing a conventional ASP/user network.
Figure 2:
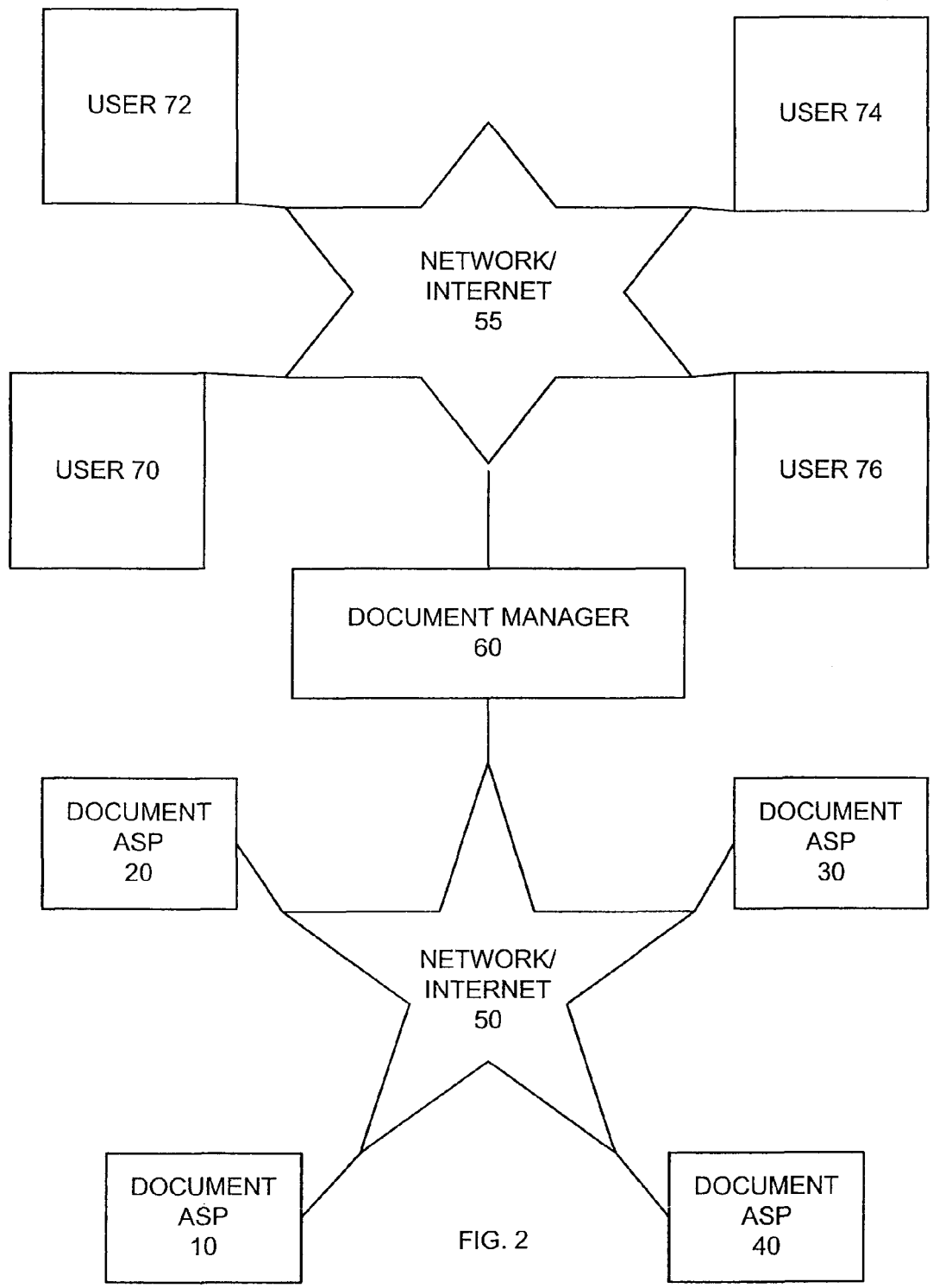
FIG. 2 is a block diagram showing an overall system configuration for managing bills issued from an ASP according to an embodiment of the present invention.

Referring now to the drawings, wherein like reference numerals designate identical or corresponding parts throughout the several views, FIG. 2 is a block diagram showing an overall system configuration for managing documents according to an embodiment of the present invention. The system includes a network 50 a plurality of ASPs 10, 20, 30, 40, a document manager 60, a network 55, and a plurality of users 70, 72, 74 and 76. The users 70-76 are interconnected by the network 55, and the ASPs 10-40 are similarly interconnected by network 50. Network 55 is connected to network 50 by way of the document manager 60, although these networks may be connected directly to each other, and may be parts of a single network such as the Internet. Thus, the users 70-76 and ASPs 10-40 are remote with respect to the document manager 60. Each user 70-76 may be a personal computer system such as the one shown as user 72 in FIG. 1, or may be implemented as the general purpose computer system shown in FIGS. 9 and 10. Alternatively, users 70-76 may be a facsimile machine, digital copier, scanner, hand held device, or any known device for processing and communicating data via a network. In addition or alternatively, users 70-76 may be implemented as a multifunction document processing center, or a document storage device such as the Ricoh eCabinet™. ASPs 10-40 are computer systems for remotely providing any of a variety of services via a communications network. The ASPs 10-40 may also be implemented as a general purpose computer such as the computer system of FIGS. 9 and 10.

The networks 50 and 55 are preferably the Internet, but can also be a local area network, a wide area network, any type of network such as an intranet, an extranet, or a combination thereof. An extranet may be used to provide controlled access to external users, for example through the Internet. How the users 70-76 and the document manager 60 can be connected to the Internet 50 and 55 is well-known in the art and is explained for example, in part 38 of "How Computers Work", by Ron White, Que Corporation, pps. 340-349, September, 1999, ISBN: 0-7897-2112-0, the entire content of this book being incorporated herein by reference. Other communications links for networks 50 and 55, such as a virtual private network, or a wireless link, may be used as well. Thus, FIG. 2 shows a system for accessing multiple ASPs through a document manager that provides a common interface to multiple users of the ASPs.

Figure 3:
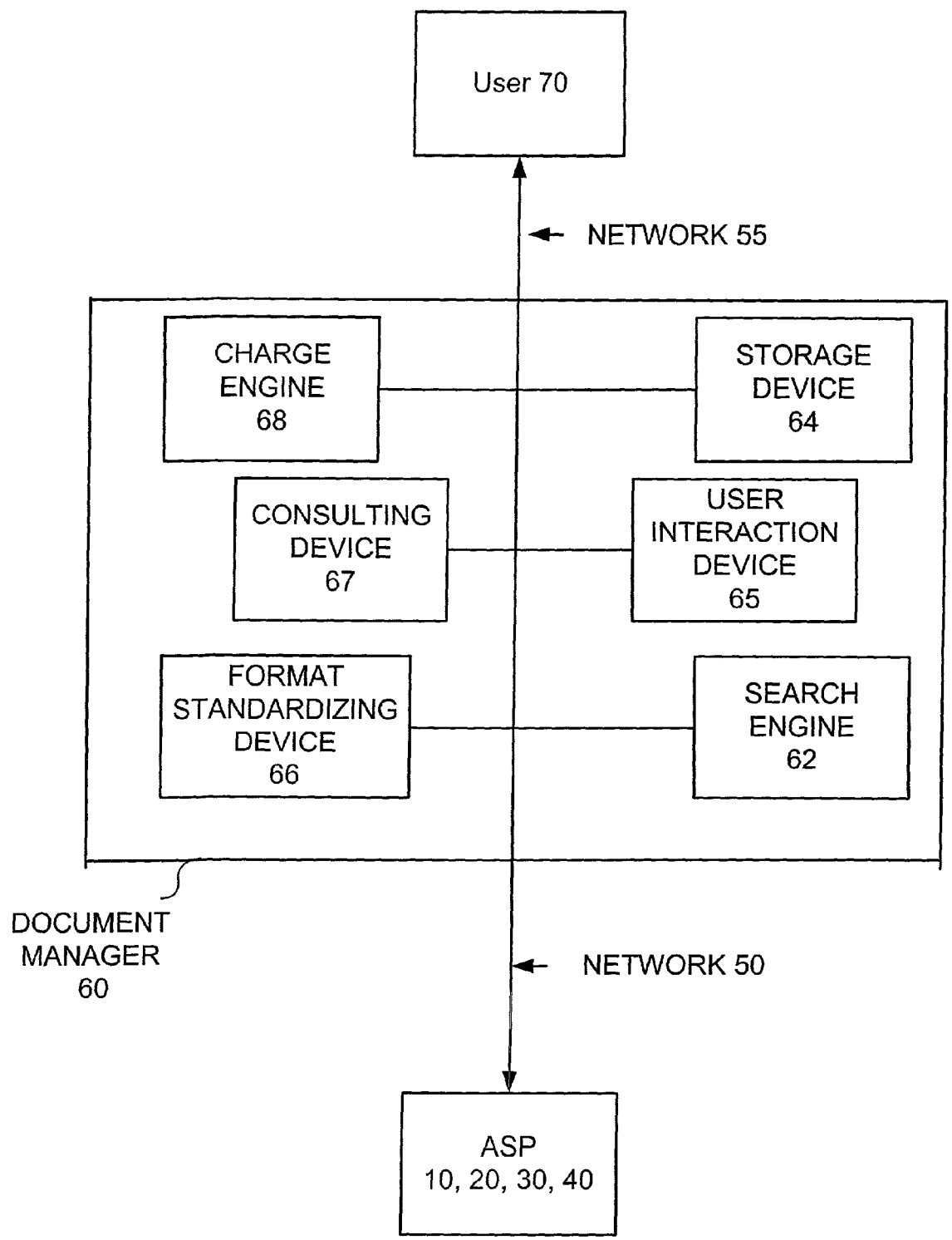
FIG. 3 is a block diagram illustrating a document manager in more detail according to one embodiment of the present invention.

FIG. 3 is a block diagram illustrating the document manager 60 in more detail according to an embodiment of the present invention. As seen in this figure, the document manager 60 connects an exemplary user 70 to ASPs 10-40 by way of networks 50 and 55. The user 70 may be implemented as any device for processing and communicating data via a network including computer system of FIGS. 9 and 10. The document manager 60 includes search engine 62, storage device 64, user interaction device 65, format standardizing device 66, consulting device 67, and charge engine 68.

In the embodiment shown in FIG. 3, user 70 interacts (exchanges data) with the document manager 60 via the user interaction device 65, so as to benefit from a number of services provided by the document manager 60. Based on data inputted from the user 70 and received by the user interaction device 65, the document manager 60 can provide consulting services via the consulting device 67 to the user 70 regarding document management in general. For example, consulting device 67 can be configured to provide advice to user 70 on topics such as document search strategies, document retrieval costs, document storage organization, updating documents, protection of secured documents, delivery options of documents, etc. In a preferred embodiment, consulting device 67 automatically provides advice to user 70 based on data inputted by user 70 via user interaction device 65. For example, the consulting device 67 may be programmed to ask a series of questions to the user 70, and to provide the user with a search strategy or storage strategy based on the user's answers. The questions asked by the consulting device 67 can be predetermined generic questions presented to any user, or personalized questions generated by the consulting device 67 based on previously acquired data from the user 70.

The user interaction device 65 also provides registration and other interface functions for the user 70. In one embodiment, the user 70 may access document manager 60 by signing on, for example using a user-name and a password, which can be verified by user interaction device 65. If the user is not a registered user, the user interaction device 65 can request information such as a name, e-mail address, postal address, a telephone number and/or billing information from the user so as to generate a membership or registration information. The user interaction device 65 may also receive the input data from the user 70 regarding the type of documents the user is requesting. For example, the user may input a requested document format, such as e-mail addresses, postal addresses, telephone numbers, or information about the type of document management needed by the user 70. The user interaction device 65 can request more information from the user and/or provide the user 70 with document managing advice, strategies, and information, for example, by way of the consulting device 67.

The document manager 60 also includes a search engine 62 configured to search and access ASPs based on data input from the user 70. The search engine 62 may also be configured to search the individual ASPs for documents when the ASPs do not have a search engine available. Thus, in the embodiment of FIG. 3, the user 70 need only input information related to the document or service required without regard to the ASP from which the desired document is to be retrieved. Search engines are well-known in the art and are explained for example, in part 32 of "How The Internet Works", by Preston Gralla, Que Corporation, pps. 185-189, August 1999, ISBN: 0-7897-2132-5, the entire content of this book being incorporated by reference.

The document manager 60 also includes a storage device 64 for storing the documents requested by the user 70 in their original formats and/or in a standardized format. The storage device 64 may also include the URLs of the ASPs from which a document was retrieved, and/or the billing information from each ASP from which the search engine 62 retrieved documents. The storage device 64 may store user information, such as user-names, user passwords, e-mail addresses, postal addresses, telephone numbers, current and prior type of documents requested, current and prior document management strategies for specific users, current and prior user-requested searches, and/or searching parameters as well as billing information for each user. In addition, the storage device may store information relating to ASPs, such as fee calculation and discount schedules. In one embodiment, the storage device 64 is accessible by the user, for example via the user interaction device 65.

The storage device 64 can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions and/or data. Moreover, the storage device 64 may include a database, i.e., a digital repository, that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software.

The document manager 60 also includes a format standardizing device 66 configured to standardize the formats of the documents retrieved from various ASPs. For example, the format standardizing device 66 can re-format the documents so that they may be accessed using a single GUI compatible with the user. Such reformatting devices are well-known in the art, and one exemplary format may be the PDF Acrobat format, by Adobe. In one embodiment, the format standardizing device 66 receives the standard format from the user interaction device 65 and stores the standardized documents in the storage device 64. The documents to be formatted by the format standardizing device 66 can be received from the ASPs via network 50, from the user 70 via the network 55, from the storage device 64, or from the user interaction device 65.

In the embodiment of FIG. 3, the document manager 60 also includes a charge engine 68 configured to charge the user 70 with a unified bill. The unified bill can correspond to the sum of the bills received from a single ASP and/or a total of all bills received from all ASPs in a predetermined billing period. Moreover, the unified bill may include charges for services provided by the document manager 60. Thus, the term "unified bill" herein means a bill that includes the charges of at least two bills, or alternatively includes the charges from at least two different entities. The bills from the ASPs can be received from the ASPs forwarded to the user interaction device 65, to the storage device 64 for storing, or to the user 70 via network 55. How the charge engine manages ASP bills and issues a unified bill to the user 70 will be further described below.

The document manager 60 described above can provide consulting advice to the user, generate document managing strategies for the user based on the user's specific needs, retrieve and organize the addresses of, and links to, ASPs 10-40, retrieve documents from the ASPs 10-40, store the documents, format the documents, bill the user a unified bill, and/or transmit the documents to the user to be viewed, printed, or stored. The document manager 60 thus provides the user with access to ASP services, the ability to retrieve from ASPs, a consistent user interface, a single sign-on service, the ability to request a single search for different documents and different document types, a single billing service, and a flexible storage service. The document manager 60 may also suggest to the user and provide the user with online print and delivery services, for example by ordering documents from the ASPs and securing their delivery to the user via a courier. In this embodiment, the document manager 60 can contract with the ASPs and the courier service to ensure proper delivery, to be the user's agent that keeps track of the delivery, and to inform the user of the status of the delivery. The document manager 60 can also generate a single bill for its services and those of the ASP and courier used.

The document manager 60 also provides the user 70 with the links to the ASP documents so that the user may access the documents via the document manager 60 without having to store any document at the computer of the user, nor at the document manager 60, if desired. In this respect, the user 70 benefits from the searching, retrieving and storing know-how of the ASPs. In this embodiment, the ASP can charge a fee for access to their documents. In one embodiment, the fee may be incorporated into a unified bill generated by the document manager 60 and provided to the user 70 for its benefit.

Furthermore, the document manager 60 permits the user to retrieve documents and to store the documents on a local storage device, either permanently or temporarily. Alternatively, the document manager allows the user 70 to store a document at the ASP. For example, the document manager 60 may be in a partnership with the ASPs to provide storage at the ASPs for documents of users, i.e. customers, of the document manager 60. For instance, a user may decide to store sensitive legal documents, insurance contracts, or digital certificates on a local storage device for a predetermined period of time, and have the documents protected from loss, theft, fire, disaster, etc. by storing them at an ASP, which may provide better protection for the secured documents. In this case, the user benefits from the ASP's know-how for handling and protecting secured documents. In this embodiment, the ASP can charge a fee for the storage. In one embodiment, such a fee would be included in a unified bill computed by the document manager for the benefit of the user.

Advantageously, the user does not have to be aware of the different ASPs used by the documents manager 60 to create the collection of documents retrieved and transmitted to the user, and used to store documents at the ASPs. Therefore, the user may deal with a single user interface when receiving the requested documents and when transmitting the user documents to be stored at the ASPs. In addition, the unified billed, generated by the ASPs for either searching, delivering, or storing documents, provided by the document manager 60 also alleviates the burden on the user 70 to pay several different bills.

The document manager 60 thus provides a single stop for consulting, billing, formatting, obtaining, reviewing, storing, and managing a variety of types of documents, such as legal, financial, insurance, engineering, accounting, or general office, educational, medical, governmental agencies documents. It is to be understood that the above-described configuration of the document manager 60 is exemplary only, as many variations of the specific hardware and software used to implement the present invention will be readily apparent to one having ordinary skill in the art. To implement such variations, general purpose computer such as computer system of FIGS. 9 and 10 may be programmed to perform the special purpose functions of any or all of items 62-68 of the document manager 60 of FIG. 3. Moreover, principles and advantages of distributed processing such as redundancy and replication, may be implemented as desired to increase the robustness and performance of the system of FIGS. 2 and 3, for example.

Figure 4:
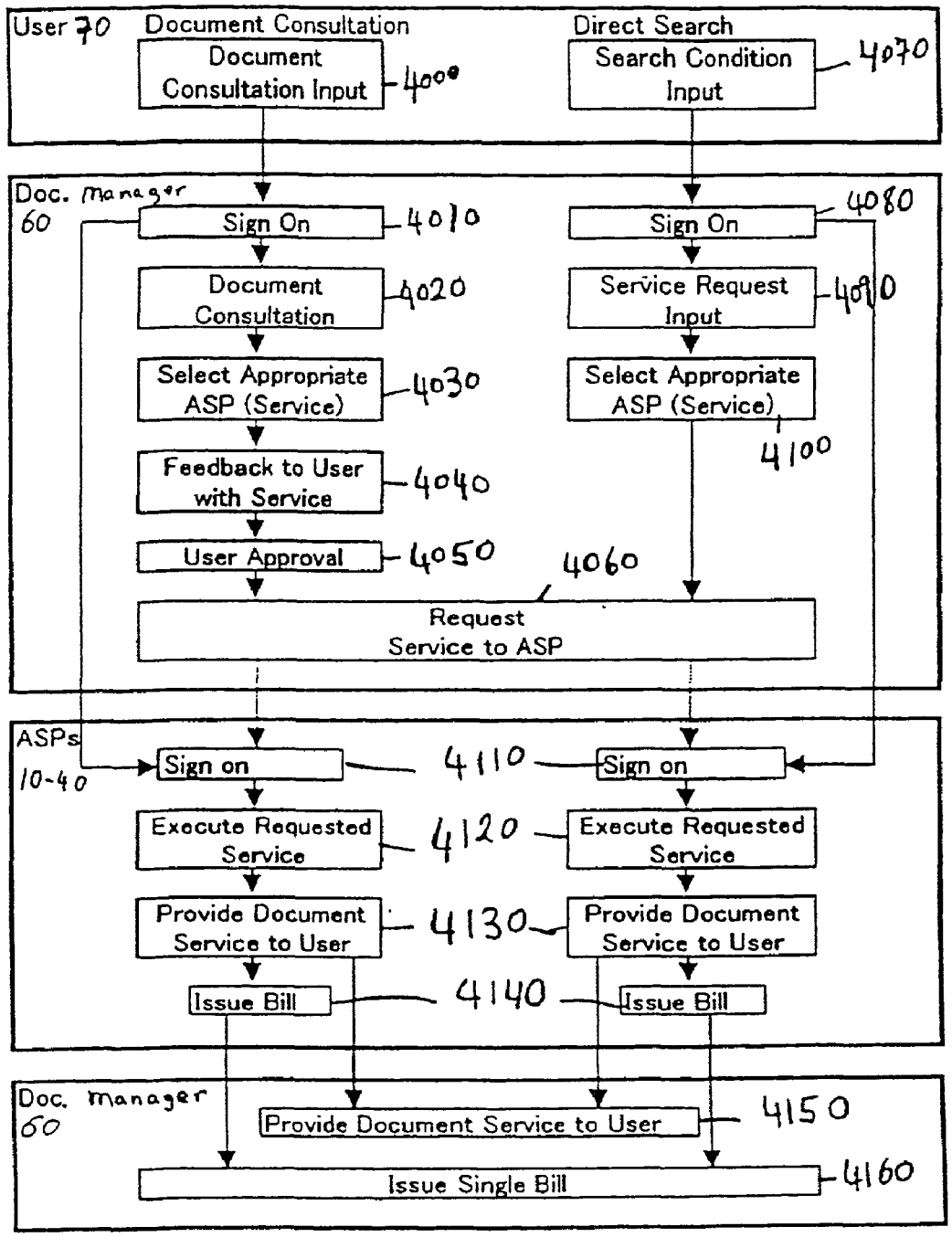
FIG. 4 is a flowchart illustrating the functionality of a document management system according to one embodiment of the present invention.

FIG. 4 is a flowchart showing the functionality of the document management system according to one embodiment of the present invention. As shown in the embodiment of FIG. 4, document manager 60 offers user 70 at least two types of services: as illustrated on the left of the diagram, the user 70 can access the document manager 60 for document consultation, and as illustrated on the right the user 70 can access the document manager 60 for a direct search. For the document consultation service, the user 70 inputs data related to the type of document consultation requested at step 4000, for example, the type, number, format of documents needed, the budget available for the service, the time constraints for completing the service, the level of security required, etc. At step 4010, the user 70 signs on the document manager 60, for example by providing a user-name and password. Once the user is signed on, the document manager 60 performs a document consultation at step 4020, for example, with the consulting device 67, which can generate a strategy for the service requested based on the inputted information from the user 70, or by asking further questions. Based on the document consultation, the document manager 60 selects the ASPs appropriate for the service requested by the user 70 at step 4030. How the document manager provides document consultation services and selects an ASP is described in U.S. patent application Ser. No. 09/839,221 filed on Apr. 23, 2001, the entire contents of which is incorporated herein by reference. The document manager 60 sends the user 70 feedback on the selection of the ASPs, at step 4040 for example indicating the costs and time of the service. Upon approval from the user 70 at step 4050, the document manager 60 requests the service from the ASPs at step 4060.

For the direct search service, the user 60 can input the search requested at step 4070. At step 4080 the user signs on the document manager and the user request is inputted at step 4090. The document manager 60 then selects the ASPs appropriate for the requested service at step 4100 and requests the service from the ASPs at step 4060.

For both services, the document manager signs on to the ASP to request the service at step 4110. In other words, if the user signs on the document manager 60, the user can access several ASPs without signing on each ASP. Once the ASPs receive the requested service, the ASPs perform (execute) the service at step 4120, for example, search for a specific document, provide the document to the user at step 4130, and bills the document manager 60 at step 4140. In preferred embodiment the ASP also transmits transaction information to the document manager 60 as part of step 4140 of issuing a bill. The transaction information preferably includes volume information for calculating volume discounts as will be further described below. The document manager 60 then provides the document(s) to the user 70 at step 4150 and issues a unified bill to the user for all services performed at step 4160. How the document manager generates and issues a unified bill will be described below. Also, for both services, the user 70 has the option of signing-on the document manager 60 at step 4010 and 4080 and the ASPs 10-40 at step 4110 and placing the request. This may be beneficial when the user knows which ASP can provide the desired service. In this case, the document manager 60 can still perform the services of issuing a single bill, or reformatting the documents in accordance to the user's requested format, and/or securing the proper delivery of the document to the user, etc.

Figure 5A:
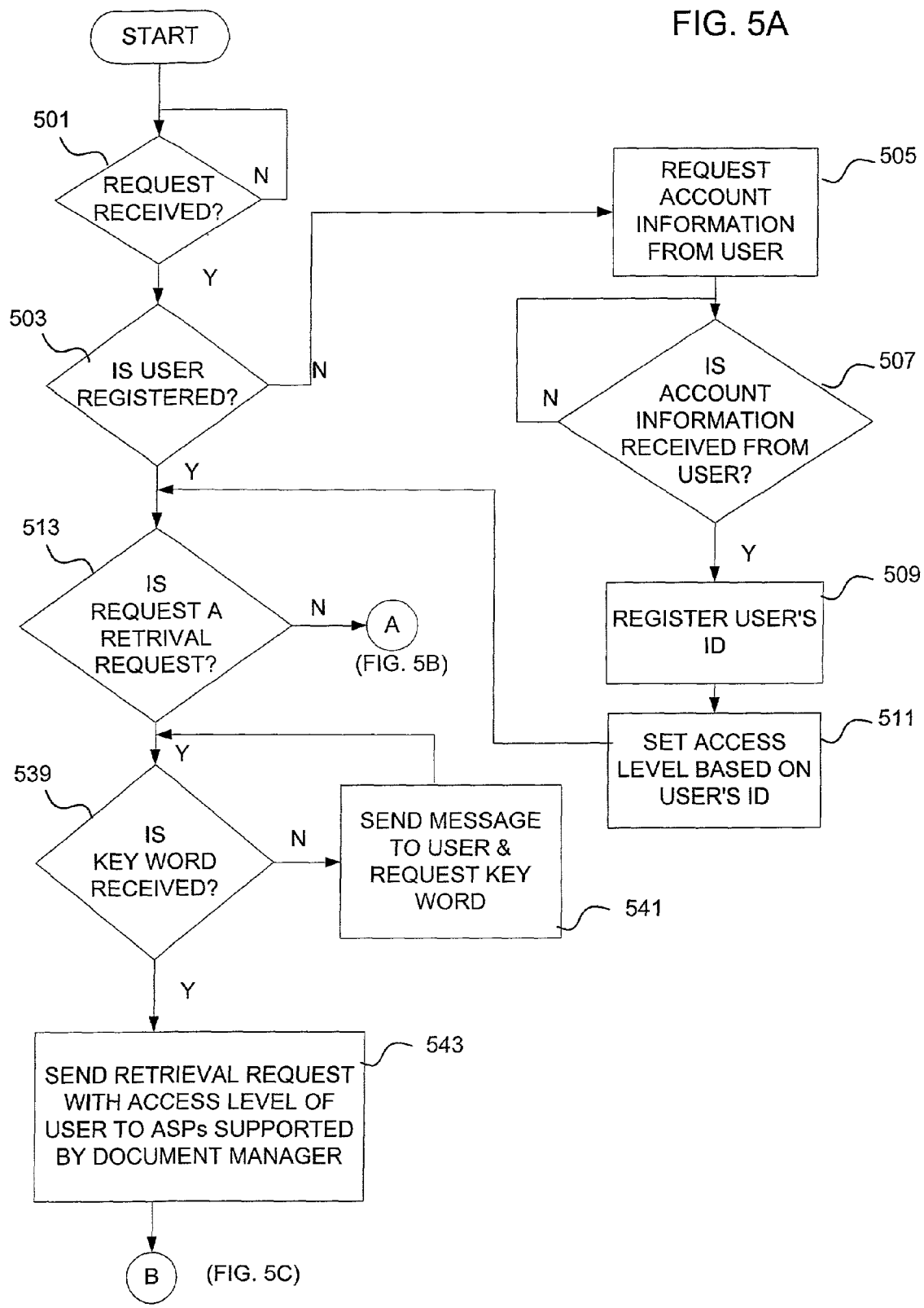
Figure 5C:
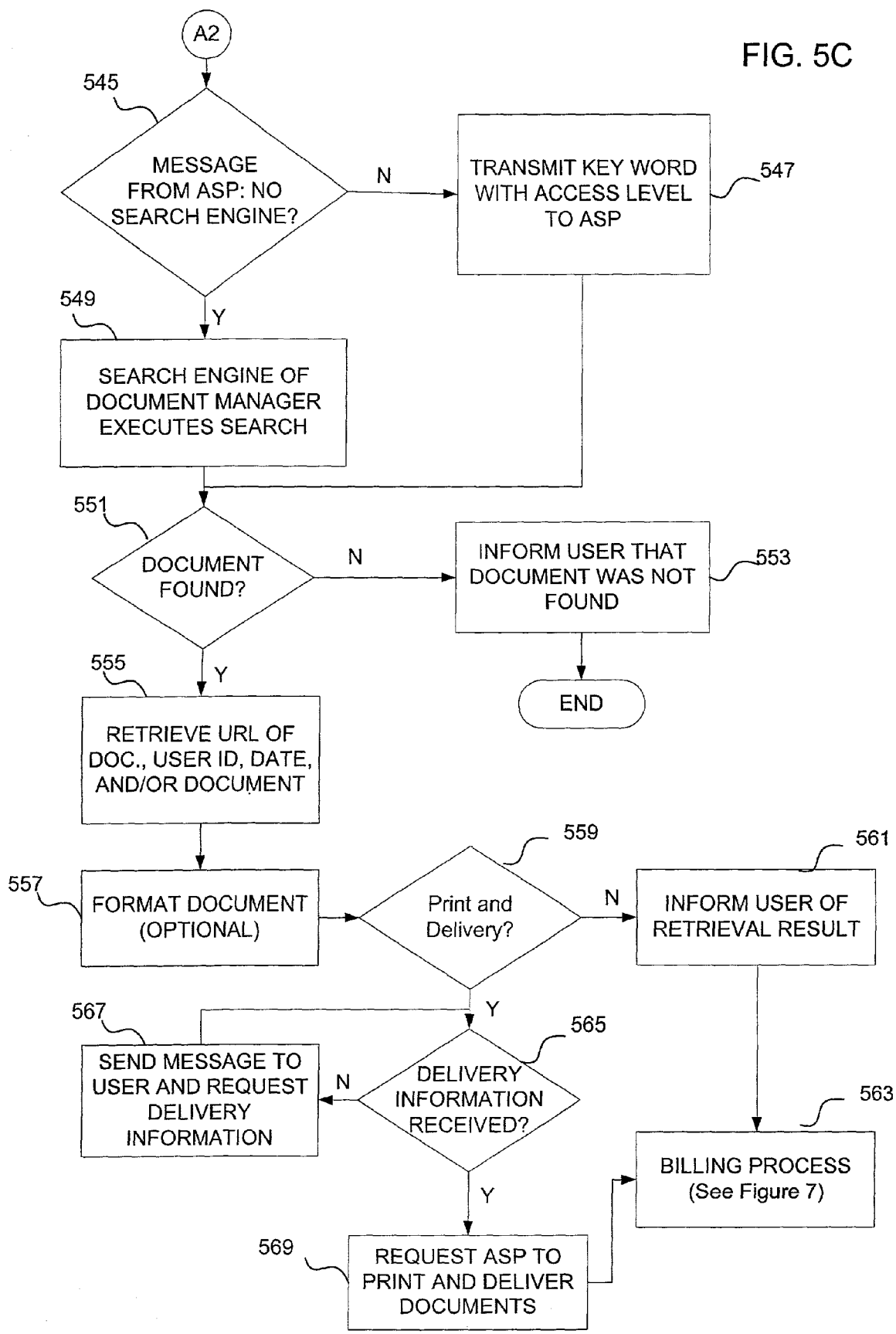

FIGS. 5A-5C are flowcharts illustrating a method of managing documents according to one embodiment of the present invention, which can be implemented by the system shown in FIGS. 2-3. As shown in FIG. 5A, in step 501 the document manager 60 monitors whether a service request is received, e.g. from a user input. If no request is received, the document manager 60 loops and returns to step 501, where it continues to monitor for requests. When a service request is received, the request is typically accompanied by other information including a user identification. Based on this information, the document manager 60 determines at step 503 whether the requesting user is a registered user of the document manager 60. If the user is not registered, the document manager requests account information from the user at step 505. At step 507, the document manager 60 determines whether the account information has been received. If the information is not received, the document manager executes a loop and continues to monitor whether account information is received by the user. In one embodiment the document manager 60 will periodically return to step 505 and request account information from the user until such account information is received. If the account information is received, the document manager 60 registers the user's ID at step 509 and sets the access level based on the registered user's ID at step 511.

The access level set in step 511 provides a level of document security for ASP users. As noted above, the document manager 60 permits storing of documents at the ASPs 10-40. In other words, the user 70 may transmit documents to the ASPs 10-40 for storage via the document manager 60. These documents may be downloaded from the user's local storage device 100 or medium drive 110, or generated by the user's PC 80, scanner, digital copier, facsimile machine, printer, or multi-function printer connected to the network 55. In a preferred embodiment, the documents stored at the ASPs 10-40 are stored in association with an access level. The access level identifies the documents which a specific user can access at the ASP via the document manager 60. The user 70 may assign an access level to each document stored at the ASP. During a retrieval operation, the user's ID is transmitted to the document manager 60 as noted above. Because an access level is assigned to each user as part of the registration process, the document manager 60 can retrieve documents that match the user's access level. As a result, security management can be accomplished and the search time can be reduced. The access level for each user can be stored in the document manager 60, for example in storage device 64. Alternatively, when documents are stored in the ASPs, the access level for each stored document can be stored at the ASPs. When the document manager 60 executes a document retrieval operation, the document manager's search engine 62 and/or the ASPs' search engine execute the retrieval operation only for documents having an access level matching the user's access level. Consequently, the retrieval time is shortened and high security documents can be accessed by only appropriate users.

An example of an access level scheme applicable to the present invention is an access level that includes three sections:

(1) a first section to identify the business entity to which the document pertains, for example a group of companies (A), an individual company (B), or an individual subsidiary (C), etc . . . ;

(2) a second section to identify the department to which the document pertains, for example the legal (1), finance (2), marketing (3), or R&D department (4), etc . . . ; and (3) a third section to identify the individual (Laura, Jim, Caroline, Phil . . . ) who created the document.

For example, a user with the access level B-2-% would have access to all (%) marketing documents (2) related to company B. Alternatively, a user having the access level A-%-Jim would have access to only the documents created by Jim, in any department (%) of the group of companies (A). Under this exemplary scheme, a legal document created by Phil for the subsidiary C would have an access level of C-1-Phil. Obviously, other access level schemes may be used in the present invention, as is understood by one of ordinary skill in the art.

Figure 6A:
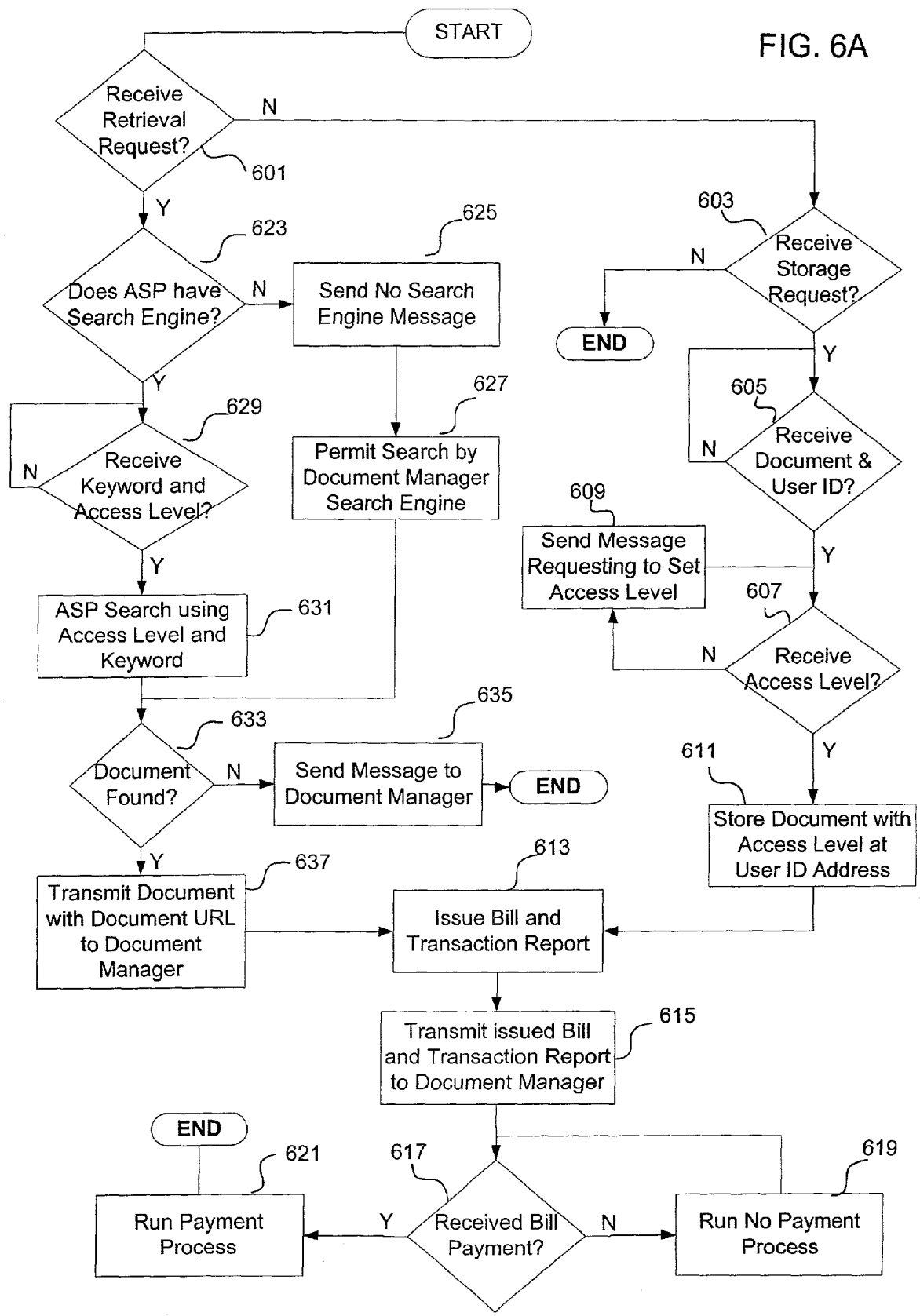
FIG. 6A shows a method of storing and retrieving documents implemented by a single ASP according to the present invention.

Returning now to FIG. 5A, at step 513, the document manager 60 determines whether the service request received in step 501 is a request to retrieve a document from an ASP. If the request is not a retrieval request, the document manager 60 determines at step 515 (see FIG. 5B) whether the request is a request to store a document in an ASP. In the embodiment of FIG. 6A, the ASP provides only storage and retrieval services. Therefore, if the ASP determines in step 603 that a storage request was not received, the document manager's routine ends. If the request is a storage request, the document manager 60 determines at step 517 whether the document to be stored has been received form the user. Where no document was received, the document manager 60 contacts the user at step 519 to inform the user that the document was not received and to request the user to send the document. The document manager 60 then executes a loop until the storage document is received. Once the storage document is received, the document manager 60 determines whether the access level for the document was received from the user as shown by step 521. If the access level was not received, the document manager 60 sends a message to the user at step 523 to request the access level of the document and executes a loop until the access level is received. Once the access level of the document to be stored is received by the document manager 60, the document manager 60 associates the access level with the storage document at step 525.

The document manager 60 then determines at step 527 whether the type of document has been received from the user. As noted above, the document type may be used for selecting an ASP in which to store the user's document. If the document type was not received, the document manager 60 sends a message to the user at step 529 to request the document type and enters a loop until the document type is received. Once the document type is received, the document manager 60 selects an ASP at step 531 to store the document based on the document type. In one embodiment, the document manager 60 uses a table stored in storage device 64 to select the ASP for storage of the document. For example, the table associates all legal documents to be stored with a first ASP, all finance documents with a second ASP, all insurance documents with a third ASP, all marketing documents with a fourth ASP, etc. Methods for using the document manager to select an ASP can be found in U.S. patent application Ser. No. 09/839,221 the entire contents of which is incorporated herein by reference. With the ASP selected, at step 533, the document manager 60 sends the document to be stored to the selected ASP, along with the user ID, and the document access level. The document manager then enters the billing process in step 535 which will be described with respect to FIG. 7.

Returning to step 513 of FIG. 5A, if the request received from the user is a request to retrieve a document, the document manager 60 determines at step 539 whether a key word is received from the user. A key word is a word, symbol, or phrase used for identifying and locating the retrieval document requested by the user. If no key word is received, the document manager 60 sends a message to the user at step 541 requesting a key word. Once a key word is received, the document manager 60 sends the request for retrieving a document to the ASPs along with the access level of the user at step 543. Turning to FIG. 5C, the document manager 60 determines at step 545 whether a message is received from the ASP informing the document manager 60 that the ASP does not have a search engine. If no such message is received, the document manager 60 sends the key word with the access level of the user to the ASPs at step 547. At step 549, the document manager's search engine 62 executes the search of the ASPs that don't have a search engine by matching documents with the key word and the access level. Whether the search is performed by the ASP or the document manager, the document manager 60 then determines at step 551 whether a document was found. If no document was found, the document manager sends a message to the user at step 553 informing the user that no document was found, and the document manager's routine can end. If a document was found, the document manager 60 retrieves and stores the URL for the document from the ASP, the user's ID, and the retrieval date, and/or the document itself as shown in step 555. Optionally, the document manager 60 can reformat the documents according to a format that the user requested as shown by step 557. The requested format may be either inputted during the present search (steps not shown) or in a previous search by the same user and saved as part of the retrieval history.

Once the document manager 60 has retrieved the requested document, the document manager determines whether the user requested a print and delivery service along with the document retrieval request as shown in decision block 559. If a print and delivery request was not made, the document manager 60 informs the user that the requested document has been received in step 561 and enters the billing process in step 563. Where a print and delivery request was received from the user, the document manager 60 determines whether delivery information was received from the user as shown in decision block 565. If no such information was received, the document manager sends a message to the user requesting delivery information and returns to step 565 to await the delivery information. In one embodiment, the document manager 60 periodically sends a request for delivery information until the delivery information is received from the user. Once the delivery information is received, the document manager requests an ASP to print and deliver the requested documents in step 569 and proceeds to the billing process in step 563.

As indicated in the process of FIG. 5 above, the document manager stores documents to, and retrieves documents from an ASP according to a user's request. FIG. 6A shows a method of storing and retrieving documents implemented by a single ASP according to the present invention. At step 601, the ASP inquires whether a retrieval request is received from the document manager 60. If a retrieval request is not received, the ASP determines at step 603 whether a document storage request is received. In the embodiment of FIG. 6A, the ASP offers only document storage and retrieval services. Therefore, if the ASP determines in step 603 that a storage request was not received, the ASP routine ends. If a document storage request is received, the ASP determines at step 605 whether the document is received with the user's ID. If either the document or user ID is not received, the ASP loops and returns to step 605, and preferably sends a message to the document manager requesting the document and the user ID. As noted above, the access level feature may be provided by the ASP. Therefore, when the document and user ID are received by the ASP, the ASP determines at step 607 whether the access level for the document is received. If no access level is received, the ASP sends a message to the document manager and/or user at step 609 and requests the user to set the access level of the document to be stored. The ASP then executes a loop until the access level is received.

When the access level is received, the ASP stores the document at step 611. In a preferred embodiment, the ASP stores the document at an address corresponding to the user's ID. The ASP then issues a bill and transaction report at step 613 and transmits the bill and transaction report to the document manager 60 at step 615. The transaction report is a report including all of the information necessary for the document manager to independently calculate the ASP fees. Thus, the transaction report may include a user ID, date and time of the transaction, and the volume amount of the transaction such as the data bytes and/or number of pages stored or retrieved. The transaction report is used by the document manager 60 to build a user history and to verify that the ASP bill is correct as will be described below. Once the bill and transaction report are transmitted to the document manager 60, the ASP monitors whether the bill is paid by the document manager as shown at step 617. If the bill is not paid, the ASP runs a no-payment process at step 619, for example by sending the user and/or the document manager 60 a reminder. If the bill is paid, the ASP runs a payment process at step 621, for example by sending the user and/or the document manager 60 a receipt, and the ASP's routine can then end.

Returning to step 601, if the received request is a document retrieve request, the ASP determines at step 623 whether the ASP has a document search engine. If the ASP does not have a search engine, in step 625, the ASP sends a message to the document manager that the ASP has no search capability. Then, in step 627, the ASP permits the search to be executed by the document manager's search engine 62. That is, the ASP sets the conditions necessary for the document manager to access and query the ASP database. If the ASP has a search engine, the ASP determines at step 629 whether the key word(s) and access level of the user are received. If not, the ASP loops until the key word(s) and access level are received form the document manager 60. In a preferred embodiment, the ASP periodically sends a message to the document manager requesting a key word and access level. When the key word and access level are received, the ASP's search engine executes the search at step 631 based on the access level of the user and the key word(s). Whether the search was conducted by the ASP or document manager, the ASP determines at step 633 whether the requested document was found. If no document was found, the ASP sends a message at step 635 to the document manager 60 to inform the document manager of the search results and the ASP routine ends. Alternatively, the ASP can send a message directly to the user. If a document was found, the ASP transmits the document and the URL of the document to the document manager at step 637. The ASP then runs the billing routine of steps 613-619 as described above with respect to the storage request.

Figure 6B:
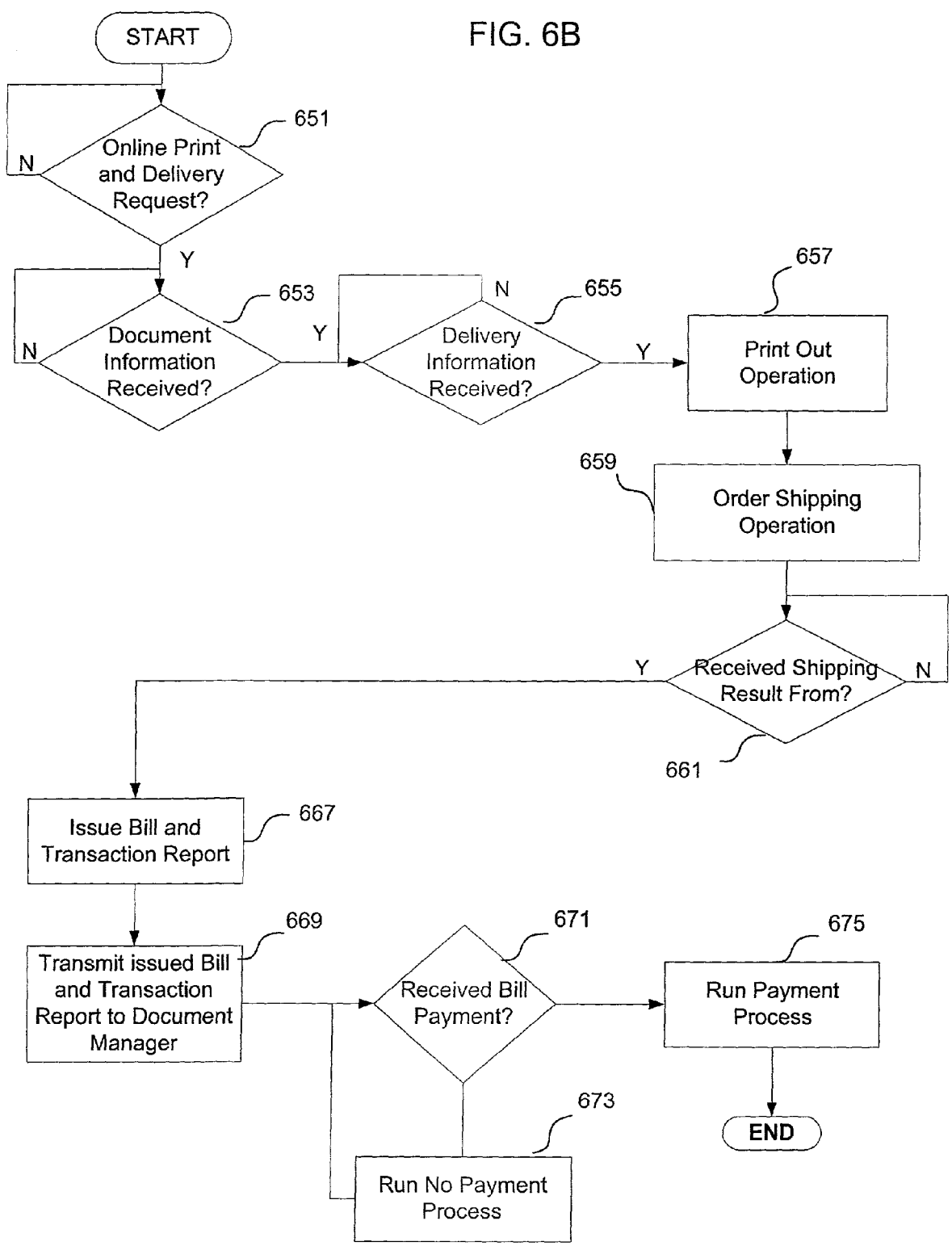
FIG. 6B is a flow chart showing the process for an ASP providing print and delivery services to a user via the document manager 60.

As noted above, ASPs may provide an online print and delivery service for users. According to the embodiment of the invention described in FIG. 5, the print and delivery service is provided by a separate ASP than the ASP for storing and retrieving documents. FIG. 6B is a flow chart showing the process for an ASP providing print and delivery services to a user via the document manager 60. In decision block 651, the ASP monitors whether an online print and delivery request is received from the document manager 60. If such a request is received, the ASP determines whether document information and delivery information was received from the document manager as indicated by decision blocks 653 and 655 respectively. When the document or delivery information was not received, the ASP executes a loop until the missing information is received. In a preferred embodiment, the ASP periodically sends a message to the document manager requesting the needed information. When all information is received, the print and delivery ASP prints a hard copy of the requested document in step 657 and orders shipping of the document in accordance with the delivery information received from the document manager as seen in step 659. In a preferred embodiment, the shipping operation is ordered automatically by the ASP which has access to an automated shipping request network for various shipping companies. Alternatively, an operator of the ASP may manually place a shipping order with a shipping company.

In decision block 661, the ASP monitors whether a shipping result is received from the shipping company. As with the ordering operation described above, the monitoring may be done automatically or manually. Moreover, the ASP may periodically send a message to the shipping company inquiring about the shipping result. Where the shipping confirmation is received, the ASP issues a bill and transaction report. As with the transaction report of the storage and retrieval ASP, the transaction report of step 667 includes all information necessary for the document manager to independently calculate the ASP fees. Thus, the transaction report may include volume information about the size of the print and delivery, the delivery distance, and any charges for rush delivery for example. This information is used by the document manager to verify the ASP bill as will be described below.

Once the ASP transmits the bill and transaction report, the ASP then monitors whether the bill is paid by the document manager 60 as shown by steps 671, 673, and 675. This process is substantially identical to steps 617, 619, and 621 described with respect to FIG. 6A.

Figure 7:
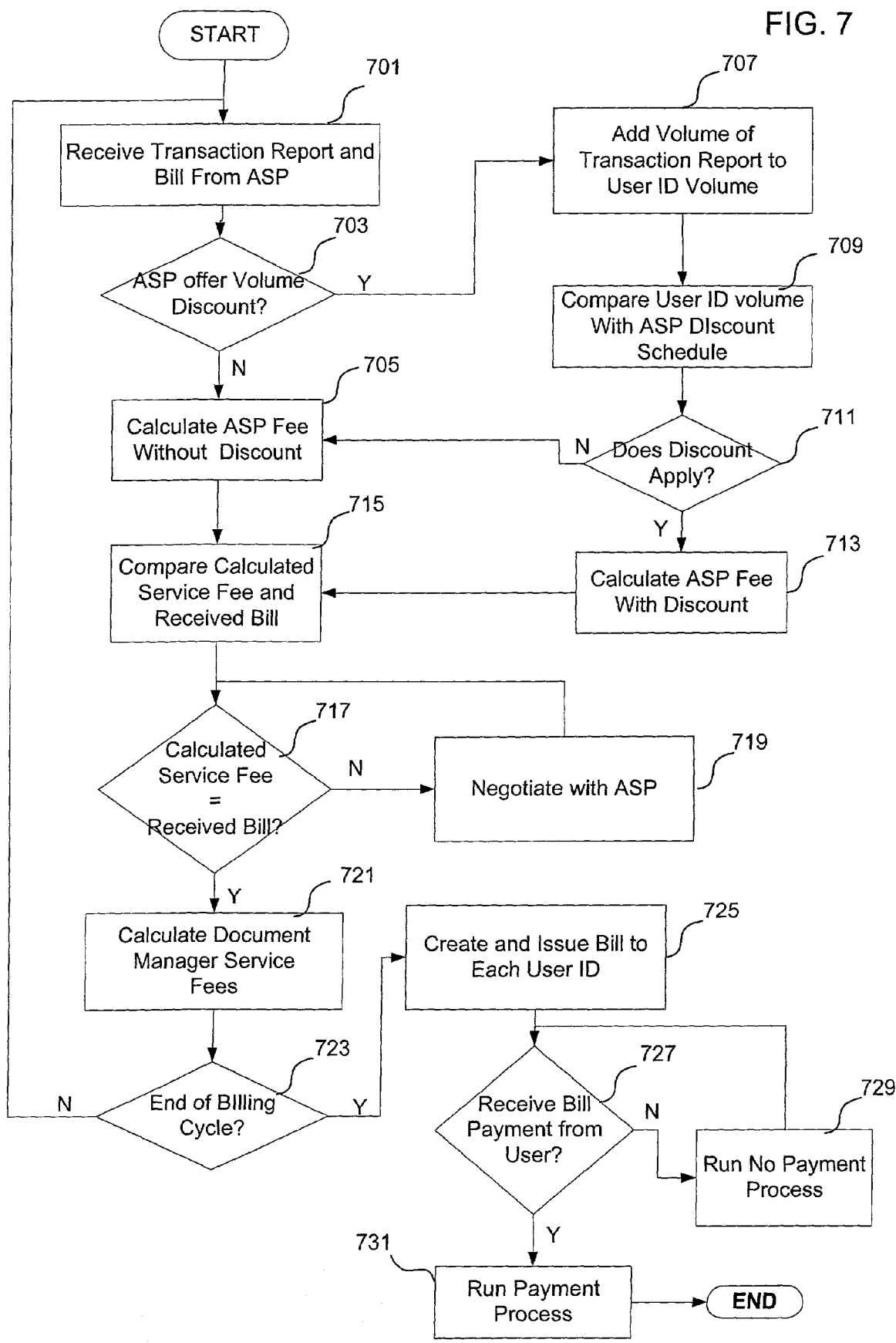
FIG. 7 is a flow chart showing the billing process of the document manager in accordance with an embodiment of the present invention.

As detailed in FIGS. 5 and 6 above, the document manager provides a convenient interface between a user and multiple ASPs. The document manager can obtain a request from the user and execute the request by accessing multiple ASPs. In this regard, the document manager can verify the charges of each ASP used by the user, determine volume discounts for each ASP, and to provide a single unified bill to the user including all ASP services as well as any document manager charges incurred in a billing period. FIG. 7 is a flow chart showing the billing process of the document manager 60 according to an embodiment of the present invention. FIGS. 8A, 8B, 8C, and 8D depict data structures for implementing a system for verifying ASP charges and determining ASP discounts, as well as issuing a unified bill in accordance with the embodiment of the present invention. The data structures are preferably in relational format, using tables, whereby information stored in one column (i.e., field) of a table is mapped or linked to information stored in the same row (i.e., record) across the other column (s) of the table, although any other format or relationship could be used. These data structures are used by the document manager 60 to manage ASP bills in accordance with the present invention. According to a preferred embodiment, the data structures are stored in storage device 64 of document manager 60. However, any one or all of data structures 8A, 8B, 8C and 8D may be stored in any other suitable storage device remote to either or both the user and document manager 60.

FIG. 8A is a storage and retrieval schedule showing the payments required from the document manager 60 to the ASP for storage and/or retrieval services obtained. As seen in this figure, the storage and retrieval fees for the ASP relating to this schedule are "Fixed Rate." Fixed rate fees are fees that are based on the cumulative volume of documents stored to or retrieved from the ASP on, for example, a month by month basis. The storage and retrieval schedule of FIG. 8A includes a field 801 for storing discount categories, a field 803 for storing discount ratios, and fields 805, 807, and 809 for storing fees for different volume amounts of storage and retrieval requests. To illustrate the use of the storage and retrieval schedule, FIG. 8A includes four exemplary entries. The first entry of FIG. 8A shows that field 801 may contain "regular charge" as a discount category, indicating that regular fees apply for the different transaction volumes. Thus, in the same record, field 803 contains no entry because a discount ratio does not apply, and fields 805, 807, and 809 includes "$5", "$10", and "$15" as regular charges for the transaction volumes. The regular charge record of table 8A may be used to calculate discount fees and/or to charge the document manager a regular charge if, for some reason, no discount applies.

The second entry of FIG. 8A shows that field 801 may contain "total less than 1 G byte" as a discount category, and in the same record, field 803 may contain the entry "40%" as a corresponding discount ratio. Moreover, the second record of the schedule in FIG. 8A also includes the entry "$3" in field 805, "$6" in field 807, and "$9" in field 809, indicating the calculated discount for the transaction volume ranges associated with the respective fields. The third and fourth entries of FIG. 8A include similar entries of discount categories and charges associated with a transaction volume. Thus, the storage and retrieval schedule associates each discount category with a charge amount corresponding to the customer's transaction amount. The storage ane retrieval schedule is preferably stored in the storage device 64, but may be stored in any suitable storage medium. How the storage and retrieval schedule is used to verify ASP charges and determine ASP discounts will be further described with respect to FIG. 7 below.

FIG. 8B is an online printing fee schedule showing the payments required from the document manager 60 to the ASP for online printing services obtained. As noted above, printing services are typically offered by a separate ASP. Thus, the printing schedule of FIG. 8B is associated with a different ASP than the storage and retrieval schedule of FIG. 8A. However, it is to be understood that the schedules of FIGS. 8A and 8B may be associated with the same ASP. As seen in FIG. 8B, the online printing fees are based on a transaction rate, which is a rate per page, regardless of the data volume included in the page in terms of data bytes. As also seen in FIG. 8B, the online printing schedule includes a field 811 for storing charge categories charged to the document manager for the online printing services, and a field 813 for charge amounts. While table 8B does not include an entry in the charge rate field corresponding to the "Special Rate" charge category, the document manager 60 may negotiate to obtain a special rate from the ASP, in which case a discounted rate will be stored in association with the "special rate."

FIG. 8C is a delivery fee schedule showing the payments required from the document manager 60 to the ASP for delivery services obtained. As with the schedules of FIGS. 8A and 8B, the delivery ASP may be associated with an independent ASP, or with an ASP that provides other services. The delivery fees are transaction fees providing a fee per delivery. Moreover, the delivery fee schedule includes a discount category field 815, a discount ratio field 817, and a rate field 819. The discount feature of the delivery fee schedule works similarly to the storing and retrieval schedule of FIG. 8A, except that the discounts are based on the number of shipping transactions rather than the volume of the documents shipped.

FIG. 8D is a monthly customer service fee schedule detailing the monthly charges to the customer. In a preferred embodiment, the monthly customer service fee schedule is created at the end of each month to provide a single data structure for including all of the services and charges pertaining to a particular customer. This single data structure is used to create and issue a unified bill to each customer ID as will be described below. As seen in FIG. 8D, the schedule includes a service field 821, a limits field 823, an ASP charge field 825, a customer charge field 827, and a document manager revenue field 829. The service field 821 includes service categories used by the customer or user during the month that table 8D applies. For example, field 821 includes the entries "storing", "printing", and "delivery", indicating that the user associated with table 8D used the document manager and ASPs for these services and must incur a charge relating to the services. As noted above, the storing, printing and delivering services are typically provided to the user by the document manager 60 accessing the services of different ASPs.

The limits field 823 includes service limits imposed on the user by the document manager 60 and/or ASP accessed by the document manager. For example, the first entry in field 823 shows that a customer may store only 150 M Bytes of information per month with a total limit of 50 G bytes, while the second entry indicates that the user limited to printing 1,000 pages monthly. The ASP charge field 825 includes charges for the associated ASP services in field 821. The ASP charges are set by the individual ASPs that provide the services in field 821. The customer charge field 821 includes the customer charges including the ASP charge and the document manager charge. In the embodiment of FIG. 8D, the document manager charge is a commission based on the ASP fees, however, other methods of calculating the customer charge may be used. The revenue field 829 includes revenues for the document manager corresponding to the associated service category. The revenue field is the difference between the ASP charge field 825 and the customer charge field 827. A total record 831 includes the totals for each of the ASP charge field, the customer charge field, and the revenue field.

The data structures embodied by the present invention include the data structures shown in FIGS. 8A through 8D, as described above. Alternatively, as is understood by one of ordinary skill in the art, any other desired manner of implementing the data structures embodied by the present invention may be equivalently implemented so that the desired functionality and corresponding practical application are achieved.

Turning now to FIG. 7, in step 701, the document manager 60 receives a transaction report and bill from the ASP. In the embodiment of FIG. 7, the document manager receives the transaction report and bill from the ASPs on a transaction by transaction basis immediately after the ASP completes the service requested by the document manager for the user. In an alternative embodiment, the document manager 60 may periodically receive bills and transaction reports from all ASPs for all users in bulk. Once the bill and transaction report are received, in step 703, the document manager 60 determines whether a volume discount is offered by the ASP from which the transaction report and bill were received. A volume discount is an agreement between the operators of the document manager and the ASP that a discounted rate will be provided to the document manager 60 and/or user if the document manager and/or user requests a predetermined amount of services from the ASP. Where the ASP does not offer a volume discount, the document manager 60 calculates the ASP fee without any discount based on the transaction report and/or fee schedules 8A-8C in step 705. As noted above, the transaction report contains all information necessary to calculate the ASP fees. Thus, in step 705, the document manager may calculate fees for storage, retrieval, print and delivery, as well as any other ASP service reported on the transaction report.

Where the ASP does offer a volume discount on a user by user basis, the document manager adds the volume of the transaction report to the user ID volume as shown by step 707. The user ID volume is a cumulative account of the volume of services obtained by the user from the ASP. The cumulative account is preferably periodically reset so that discounts can be provided based on the volume of work ordered by the user per unit time. In an alternative embodiment, the document manager 60 may maintain a cumulative account of the volume of services obtained by the document manager 60 for all users which can be used to obtain a discount from the ASP.

Once the document manager adds the transaction volume to the user's total volume, the document manager compares the user ID volume with the ASP discount schedule as shown in step 709. Where the transaction report reports a storage or retrieval request, the document manager 60 accesses the storage and retrieval fee schedule described in FIG. 8A. For example, where the transaction report indicates that the user's transaction was to store a document of less than 100 M Bytes, and the user has a cumulative monthly storage volume of between 1 G Byte and 100 G bytes, the document manager will refer to the third entry in field 801 of Table 8A and determine that a discount applies as indicated by decision block 7111.

Where no discount applies, the document manager proceeds to step 705 and calculates the ASP fee without a discount as discussed above. Where a discount does apply, the document manager calculates the ASP fee with the discount as shown in step 713. Returning to the example noted above, the document manager would access the highlighted field of Table 8A and determine that the discounted ASP fee is $2.50. The fee schedules of FIGS. 8B and 8C can be similarly used to calculate discounts for print and delivery services respectively.

Whether the ASP fee is calculated with a discount or without a discount, the document manager verifies that the ASP bill is accurate. Thus, in step 715, the document manager compares the calculated service fee with an amount of the received bill, and determines in decision block 717 whether the calculated ASP fee is equal to the received bill for this user. Where there is disagreement between the calculated ASP fees and the ASP bill, the document manager 60 proceeds to step 719 where it negotiates with the ASP. The negotiation may take many forms including automatically sending an error message to the ASP and/or indicating to an operator of the document manager that a discrepancy exists that needs to be resolved with the operator of the ASP. During the negotiation step 719, the calculated ASP fee and/or the received ASP bill are adjusted until these numbers are in agreement.

When the calculated ASP fee is equal to the ASP bill, the document manager 60 calculates the document manager service fee. The document manager service fee may include a fixed fee for each service obtained by the document manager from the ASP, or may be calculated as a commission based on the ASP fees. A fee schedule for the document manager fee calculation was described with respect to FIG. 8D above. As seen in this figure, the document manager charge is a 10% commission over the ASP fees. For example, the customer charge for storing documents is $5.50 which is 110% of the ASP charge of $5. Similarly, the printing charge for the customer is $275.00 which is 110% of the ASP charge of $250.00.

Returning to FIG. 7, after the document manager calculates fees in step 721, the document manager 60 determines whether the billing cycle has ended. If the billing cycle has not ended, the document manager returns to step 701 where it repeats the process of receiving and verifying transaction reports and ASP bills. Where the end of the billing cycle has arrived, the document manager issues a bill to each user ID as shown in step 725. In step 727, the document manager determines whether the issued bill has been paid by the user. if the issued bill has not been paid by the user, the document manager runs a no payment process in step 729. If the bill has been paid by the user, the document manager runs a payment process in step 731 and ends the routine.

In this regard, according to the present invention, the document manager issues a unified bill to the user similar to the format of FIG. 8D, for example. As previously noted, this figure includes storing, printing and delivering charges that may be issued from different ASPs. Thus as part of step 725, the document manager 60 issues a unified bill including all charges from different ASPs pertaining to a particular customer.

Figure 9:
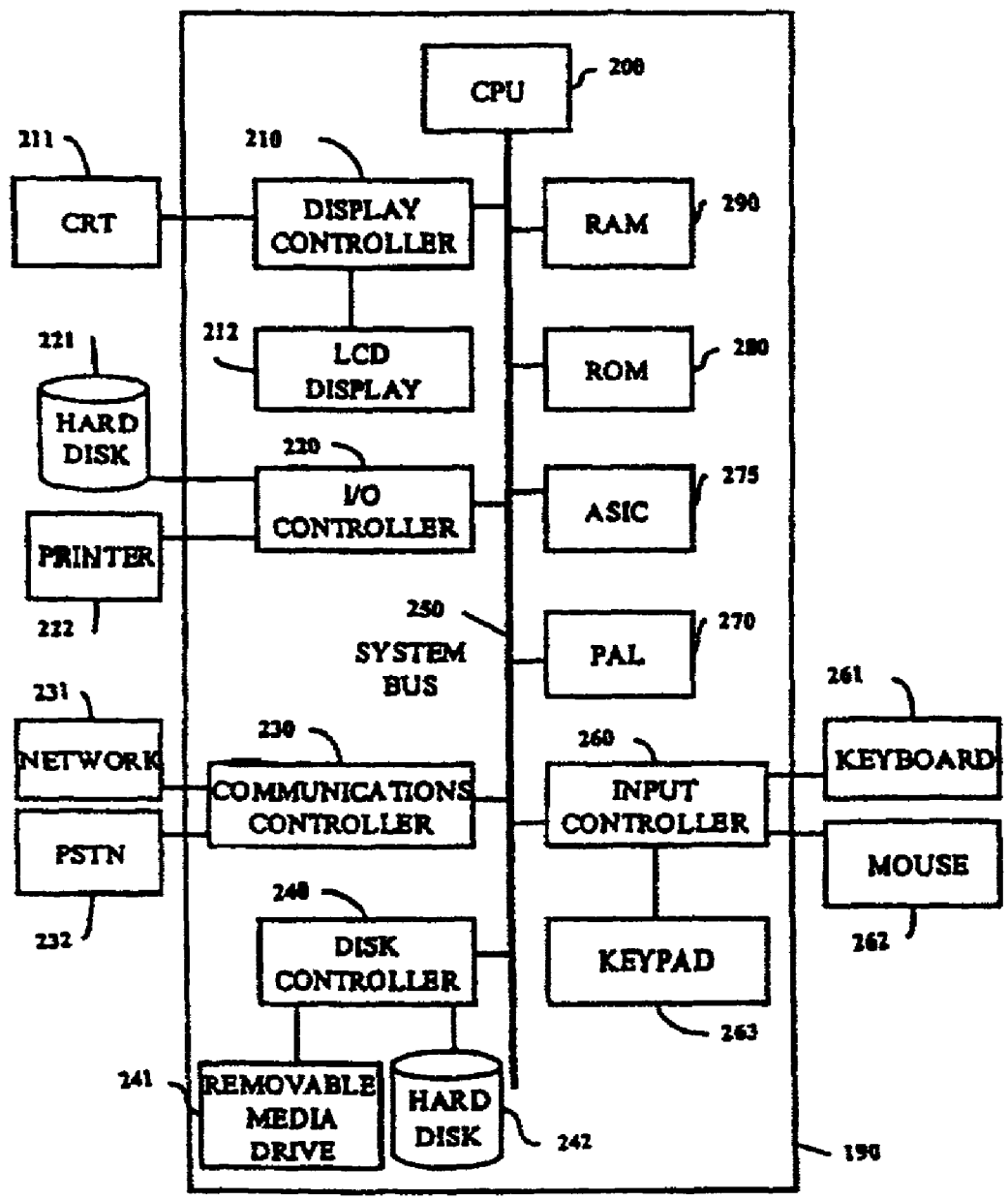
FIG. 9 is a block diagram of a device that can be used as the user and/or the document manager in accordance with the present invention.
Figure 10:
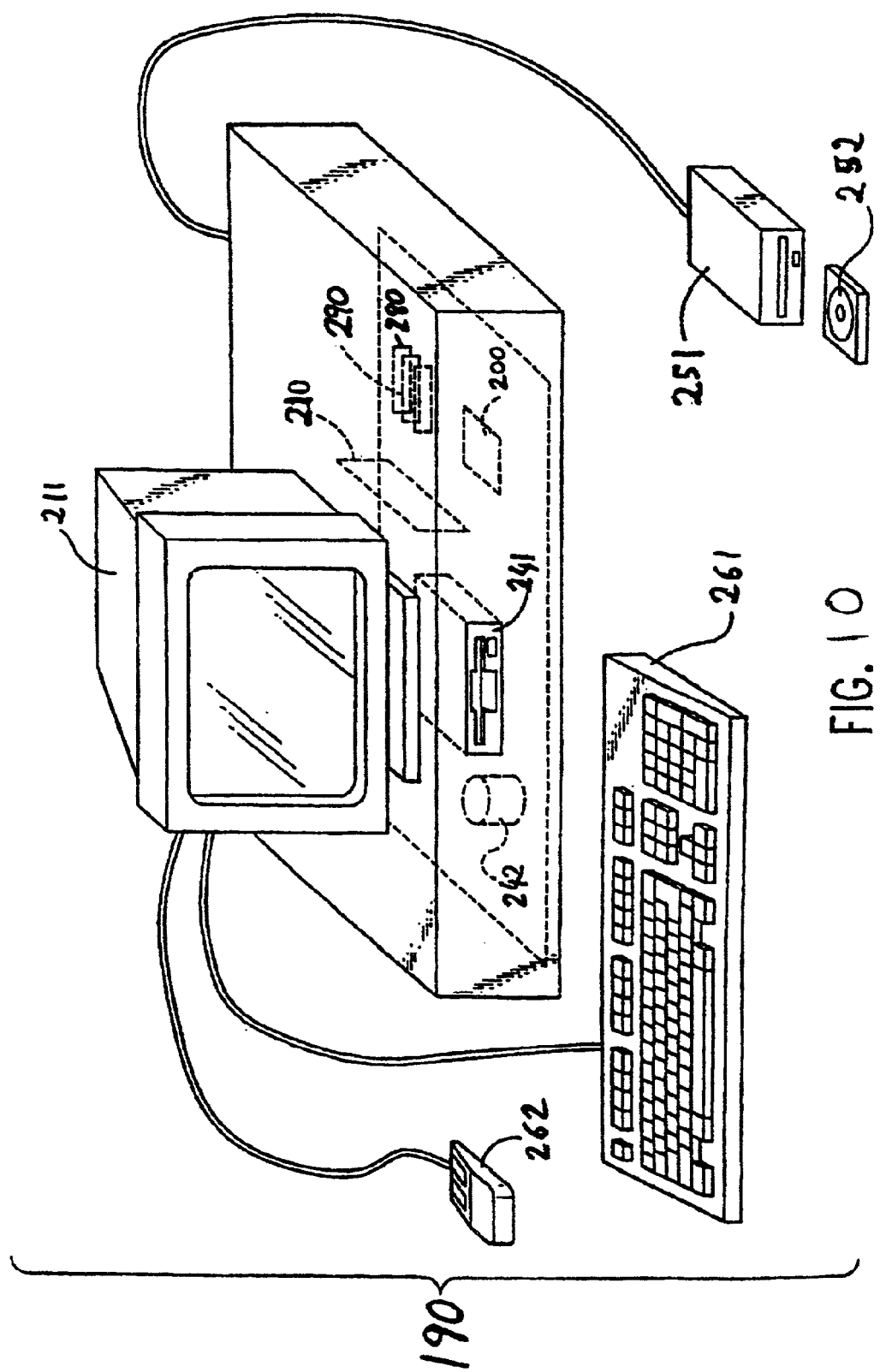
FIG. 10 is a schematic diagram of a device that can be used as the user and/or the document manager in accordance with the present invention.

FIG. 9 is a block diagram of a device 190 that can be used as the user 70 and the document manager 60 shown in FIGS. 2 and 3 and can implement the methods shown in FIGS. 4-6. FIG. 10 is a schematic representation of device 190. The device 190 includes a central processing unit 200 (CPU) that communicates with a number of other devices by way of a system bus 250. The device 190 includes a random access memory (RAM) 290 that hosts temporary storage values used in implementing the document managing functions of the document managers, such as document texts, document graphics, document formats, ASPs' URLs, ASP billing information, etc.

A conventional personal computer or computer workstation with sufficient memory and processing capability may also be configured to operate as device 190. In one embodiment, device 190 operates as the document manager 60, both receiving and transmitting information by users and ASPs. Central processing unit 200 is configured for high volume data transmission and performing a significant number of mathematical calculations in processing communications and database searches. A Pentium III microprocessor such as the 1 GHz Pentium III manufactured by Intel Inc. may be used for CPU 100. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 280 is preferably included in a semiconductor form although other read-only memory forms including optical media may be used to host application software and temporary results. The ROM 280 connects to the system bus 250 for use by the CPU 200. The ROM 280 includes computer readable instructions that, when executed by the CPU 200, perform the different functions discussed above associated with managing documents from ASPs. An input controller 260 connects to the system bus 250 and provides an interface with various peripheral equipment including a keyboard 261 and a pointing device such as a mouse 262. The input controller 260 may include different ports such as a mouse port in the form of a PS2 port or, for example, a universal serial bus (USB) port. The keyboard port for the input controller 260 is in the form of a mini-DIN port although other connectors may be used as well. The input controller 260 provides sound card connections so that external jacks on the sound card allow users to attach microphone speakers or an external sound source. The input controller 260 also may include serial ports or parallel ports as well.

A disk controller 240 is in the form of an IDE controller and connects via ribbon cables to a floppy disk drive 241 as well as a hard disk drive 242, a CD-ROM drive 251 and a compact disk 252 (FIG. 8). In addition, a PCI expansion slot is provided on the disk controller 240 or mother board that hosts the CPU 200. An enhanced graphic port expansion slot is provided and provides 3-D graphics with fast access to the main memory. The hard disk 242 may also include a CD-ROM that may be readable as well as writeable. A communication controller 230 provides a connection, perhaps by way of an Ethernet connection to a network 231. The network may be a connection to the public switch telephone network (PSTN) 232 for providing Internet access, or a local area network, wide area networks, a virtual private network (VPN), an extranet. In one embodiment, the network 231 and the connection to the communication controller 230 are made by way of a plurality of connections including a cable-modem connection, DSL connection, dial-up modem connection, and the like that connect to the communication controller 230.

An input/output controller 220 also provides connections to external components such as an external hard disk 221, printer 222, for example, by way of an RS 232 port and a SCSI bus. For more information on how the input/output devices operate according to the present invention, such devices are described in part 5 of "How Computers Work", by Ron White, Que Corporation, pps. 184-276, September, 1999, ISBN: 0-7897-2112-0, the entire content of which is hereby incorporated by reference.

A display controller 210 interconnects the system bus 250 to a display device, such as a cathode ray tube (CRT) 211. While a CRT is shown, a variety of other display devices may be used such as an LCD (liquid crystal display), or plasma display device. As noted above, the components shown in FIG. 5 can be included in both the user 70 and the document manager 60 shown in FIGS. 2-4.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product for managing ASP documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims the present invention may be practiced otherwise than as specifically described herein. For example, the above methods (FIGS. 4-7) represent exemplary embodiments of the present invention, and the present invention is not limited to the specific steps, nor the order of the steps, presented above. A person of ordinary skill in the art would recognize that the present invention can be implemented using a variety of similar steps in a variety of orders.

What is claimed is:

1. A method for managing bills issued from applications service providers (ASPs) at a document manager server remote from the ASPs, comprising:
   receiving a request to store a document from a remote user via a network interface at the document manager server;
   receiving said document, an access level corresponding to said document and a document type corresponding to said document from said remote user via said network interface at said document manager server;
   storing, at a memory of the document manager server, management information corresponding to the ASPs and said remote user, wherein said management information includes a table identifying a document type corresponding to each of said ASPs;
   automatically selecting, by said document manager server, an ASP to store said document based on said document type by consulting the table included in the stored management information corresponding to the ASPs and selecting an ASP identified in said table as corresponding to said document type;
   generating, by said document manager server, an ASP service request corresponding to said selected ASP;
   forwarding said ASP service request, said access level corresponding to said document and said document to said selected ASP via said network interface of said document manager server;
   receiving, at said network interface of said document manager server, a service bill from said ASP, said service bill including fees assessed by said selected ASP corresponding to storing said document; and
   incorporating, by said document manager server, said service bill into a unified bill corresponding to said remote user that includes charges incurred at other ASPs in addition to said fees assessed by said selected ASP corresponding to storing said document and issuing said unified bill to said remote user via said network interface of said document manager server.

2. The method of claim 1, further comprising:
   calculating an ASP fee, wherein calculating said ASP fee comprises determining a discount offered by said ASP.

3. The method of claim 2, wherein said determining a discount offered by said ASP comprises determining a discount on a customer by customer basis.

4. The method of claim 3, wherein said determining a discount comprises:
   receiving a transaction report including information about a transaction volume for a particular user;
   adding the transaction volume to a stored user ID volume pertaining to a cumulative volume for said particular user; and
   determining a discount for the particular user based on said cumulative volume.

5. The method of claim 4, further comprising periodically resetting said stored cumulative amount to zero.

6. The method of claim 2, wherein said determining a discount offered by said ASP comprises determining a discount based on a volume usage of a document management system providing access to the ASP for a plurality of users.

7. The method of claim 1, further comprising verifying that said service bill from the ASP is accurate.

8. The method of claim 7, wherein said receiving a service bill comprises:
   receiving a charge amount calculated by the ASP; and
   receiving a transaction report including information for independently calculating a charge for services requested.

9. The method of claim 8, wherein said verifying comprises:
  receiving a transaction report from the ASP;
  calculating an ASP fee based on said transaction report; and
  comparing the calculated amount with an amount of said ASP bill amount.

10. The method of claim 9, further comprising:
  determining that there is a discrepancy between said calculated fee and said billing amount; and
  negotiating with said ASP to resolve said discrepancy.

11. The method of claim 1, further comprising:
  receiving a plurality of service requests from said remote user;
  forwarding said plurality of service requests to at least two different ASPs;
  receiving a service bill from each of said at least two different ASPs; and
  combining the service bills from each of the ASPs into said unified bill and issuing the unified bill to said remote user.

12. The method of claim 1, further comprising:
  receiving a plurality of service requests from said remote user at different times;
  forwarding said plurality of service requests to the ASP at different times;
  receiving at least two different service bills from the ASP at two different times, and storing said two different service bills; and
  combining the two different service bills into said unified bill and issuing the unified bill to said remote user.

13. The method of claim 1, further comprising monitoring whether the user pays the bill issued.

14. A computer readable medium containing program instructions which cause a computer to execute a method of managing bills issued from applications service providers (ASPs), comprising:
  receiving a request to store a document from a remote user;
  receiving said document, an access level corresponding to said document and a document type corresponding to said document from said remote user;
  storing, at a memory of the computer, management information corresponding to the ASPs and said remote user, wherein said management information includes a table identifying a document type corresponding to each of said ASPs;
  automatically selecting an ASP to store said document based on said document type by consulting the table included in the stored management information corresponding to the ASPs and selecting an ASP identified in said table as corresponding to said document type;
  generating an ASP service request corresponding to said selected ASP;
  forwarding said ASP service request, said access level corresponding to said document and said document to said ASP;
  receiving a service bill from said ASP, said service bill including fees assessed by said selected ASP corresponding to storing said document; and
  incorporating said service bill into a unified bill corresponding to said remote user that includes charges incurred at other ASPs in addition to said fees assessed by said selected ASP corresponding to storing said document and issuing said unified bill to said remote user.

15. A system for managing bills issued from applications service providers (ASPs), comprising:
  a memory configured to store management information related to the ASPs and a remote user, wherein said management information includes a table identifying a document type corresponding to each of said ASPs; and
  a processor in communication with said memory and configured to:
    receive a request to store a document from a remote user;
    receive said document, an access level corresponding to said document and a document type corresponding to said document from said remote user;
    automatically select an ASP to store said document based on said document type by consulting the table included in the stored management information corresponding to the ASPs and selecting an ASP identified in said table as corresponding to said document type;
    generate an ASP service request corresponding to said selected ASP;
    forward said ASP service request, said access level corresponding to said document and said document to said selected ASP;
    receive a service bill from said ASP, said service bill including fees assessed by said selected ASP corresponding to storing said document; and
    incorporate said service bill into a unified bill corresponding to said remote user that includes charges incurred at other ASPs in addition to said fees assessed by said selected ASP corresponding to storing said document and issue said unified bill to said remote user.

16. The system of claim 15, wherein said processor is configured to calculate an ASP fee by determining a discount offered by said ASP.

17. The system of claim 16, wherein said processor is configured to determine a discount offered by said ASP by determining a discount on customer by customer basis.

18. The system of claim 17, wherein said processor is configured to determine a discount by:
  receiving a transaction report including information about a transaction volume for a particular user;
  adding the transaction volume to a stored user ID volume pertaining to a cumulative volume for said particular user; and
  determining a discount for the particular user based on said cumulative volume.

19. The system of claim 18, wherein said processor is further configured to periodically reset said stored cumulative amount to zero.

20. The system of claim 16, wherein said processor is configured to determine a discount offered by said ASP by determining a discount based on a volume usage of a document management system providing access to the ASP for a plurality of users.

21. The system of claim 15, wherein said processor is further configured to verify that said service bill from the ASP is accurate.

22. The system of claim 21, wherein said processor is configured to receive a service bill by:
  receiving a charge amount calculated by the ASP; and
  receiving a transaction report including information for independently calculating a charge for services requested.

23. The system of claim 22, wherein said processor is configured to verify that said service bill from the ASP is accurate by:

receiving a transaction report from the ASP;

calculating an ASP fee based on said transaction report; and comparing the calculated amount with an amount of said ASP bill amount.

24. The system of claim 23, wherein said processor is further configured to:

determine that there is a discrepancy between said calculated fee and said billing amount; and negotiate with said ASP to resolve said discrepancy.

25. The system of claim 15, wherein said processor is configured to:

receive a plurality of service requests from said remote user;

forward said plurality of service requests to at least two different ASPs;

receive a service bill from each of said at least two different ASPs; and combine the service bills from each of the ASPs into said unified bill and issuing the unified bill to said remote user.

26. The system of claim 15, wherein said processor is configured to:

receive a plurality of service requests from said remote user at different times;

forward said plurality of service requests to the ASP at different times;

receive at least two different service bills from the ASP at two different times, and storing said two different service bills; and combine the two different service bills into said unified bill and issuing the unified bill to said remote user.

27. The system of claim 15, wherein said processor is further configured to monitor whether the user pays the bill issued.

28. A system for managing bills issued from applications service providers (ASPs), comprising:

means for receiving a request to store a document from a remote user;

means for receiving said document, an access level corresponding to said document and a document type corresponding to said document from said remote user;

means for storing management information corresponding to said ASPs and said remote user, wherein said management information includes a table identifying a document type corresponding to each of said ASPs;

means for automatically selecting an ASP to store said document based on said document type by consulting the table included in the stored management information corresponding to the ASPs and selecting an ASP identified in said table as corresponding to said document type;

means for generating an ASP service request corresponding to said selected ASP;

means for forwarding said ASP service request, said access level corresponding to said document and said document to said selected ASP;

means for receiving a service bill from said ASP, said service bill including fees assessed by said selected ASP corresponding to storing said document; and means for incorporating said service bill into a unified bill corresponding to said remote user that includes charges incurred at other ASPs in addition to said fees assessed by said selected ASP corresponding to storing said document and issuing said unified bill to said remote user.

29. The system of claim 28, further comprising means for verifying that said service bill from the ASP is accurate.

30. The system of claim 29, wherein said means for receiving a service bill comprises:

means for receiving a charge amount calculated by the ASP; and means for receiving a transaction report including information for independently calculating a charge for services requested.

31. The system of claim 30, wherein said means for verifying comprises:

means for receiving a transaction report from the ASP;

means for calculating an ASP fee based on said transaction report; and means for comparing the calculated amount with an amount of said ASP bill amount.

32. The system of claim 31, further comprising:

means for determining that there is a discrepancy between said calculated fee and said billing amount; and means for negotiating with said ASP to resolve said discrepancy.

33. The system of claim 28, further comprising means for monitoring whether the user pays the bill issued.

* * * * *